Sept. 12, 1950 E. V. BUNTING 2,521,895
EARTH BORING ATTACHMENT FOR TRACTORS
Filed Aug. 23, 1945 3 Sheets-Sheet 1
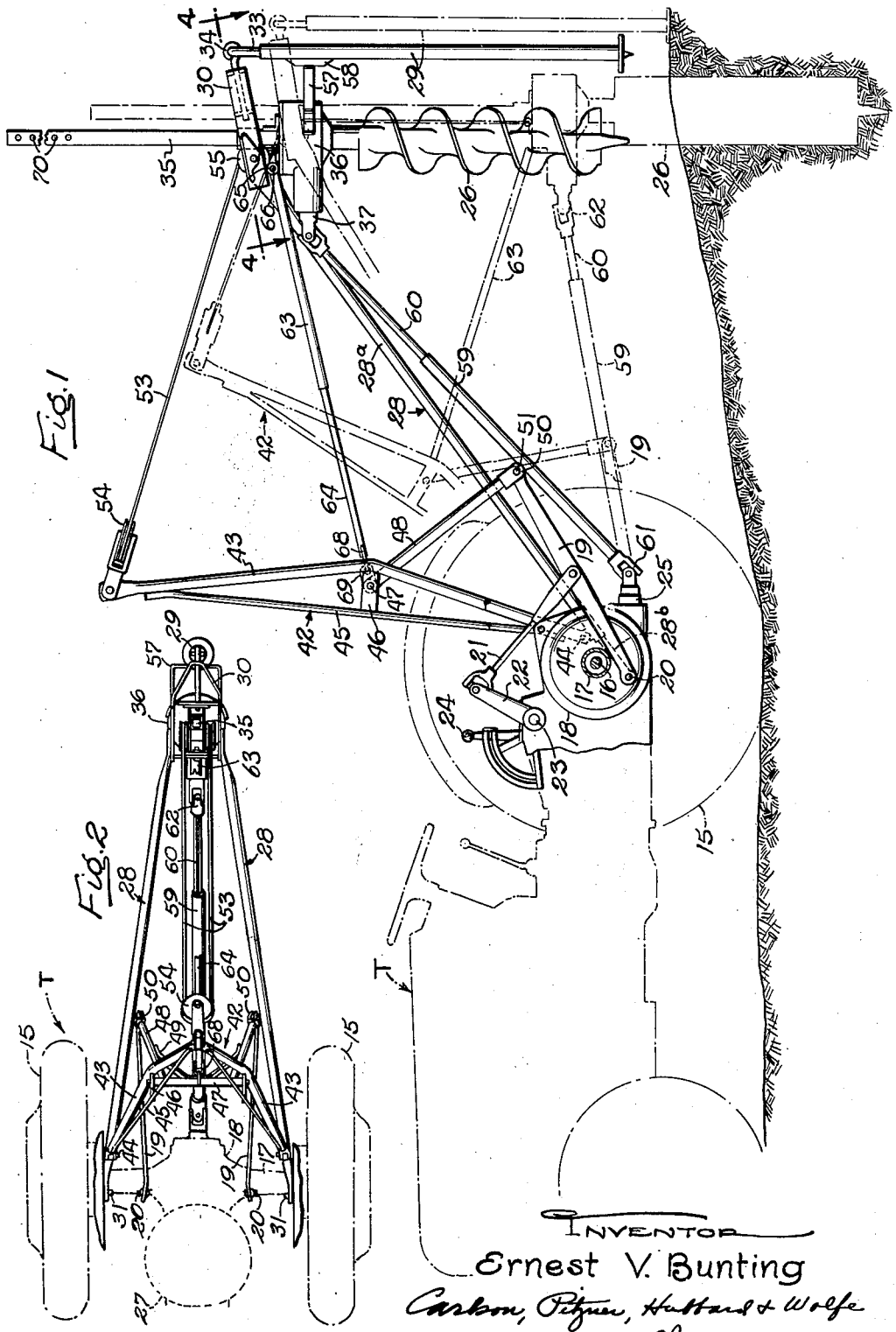
INVENTOR
Ernest V. Bunting
Carson, Pitzner, Hubbard & Wolfe
ATTORNEYS

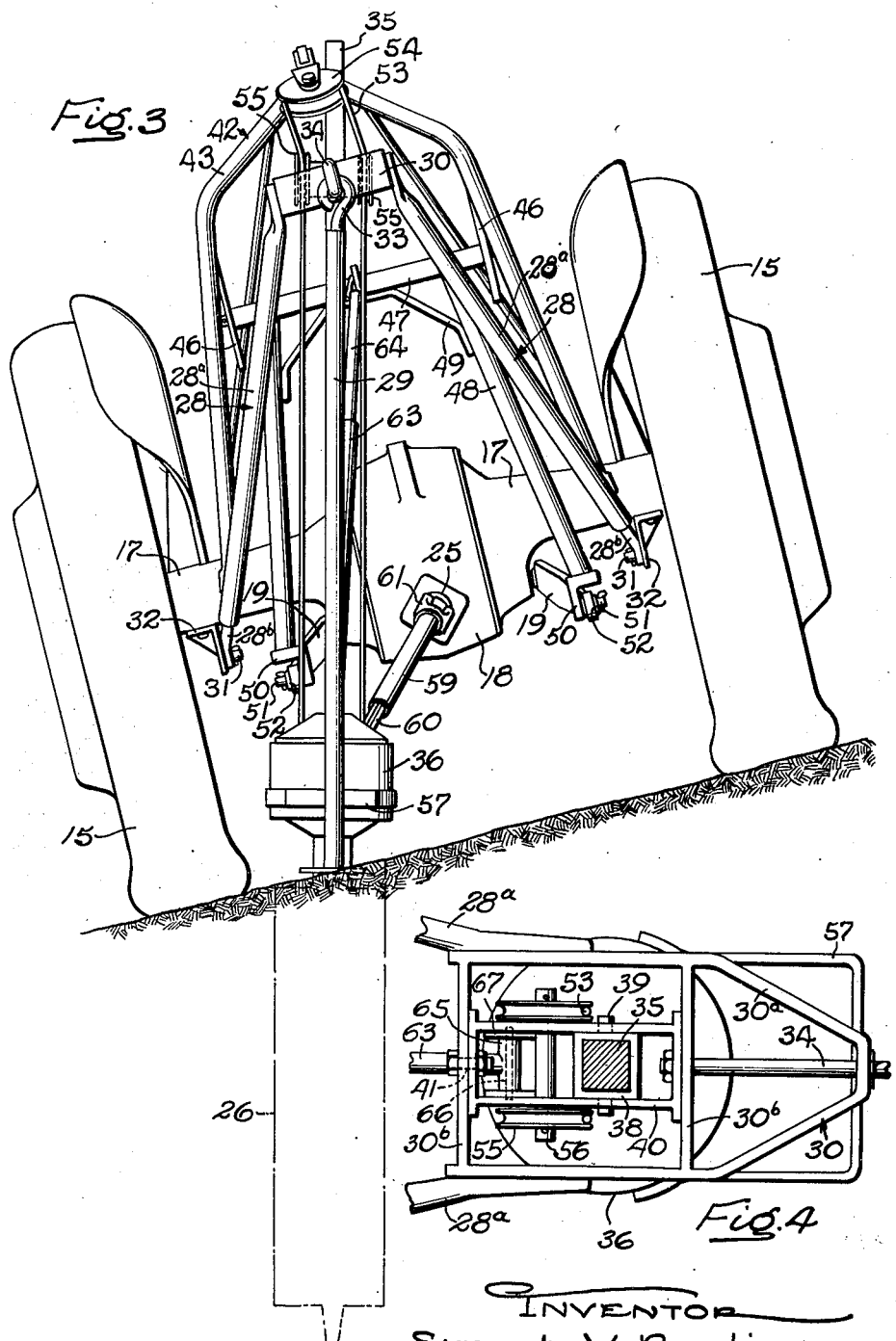

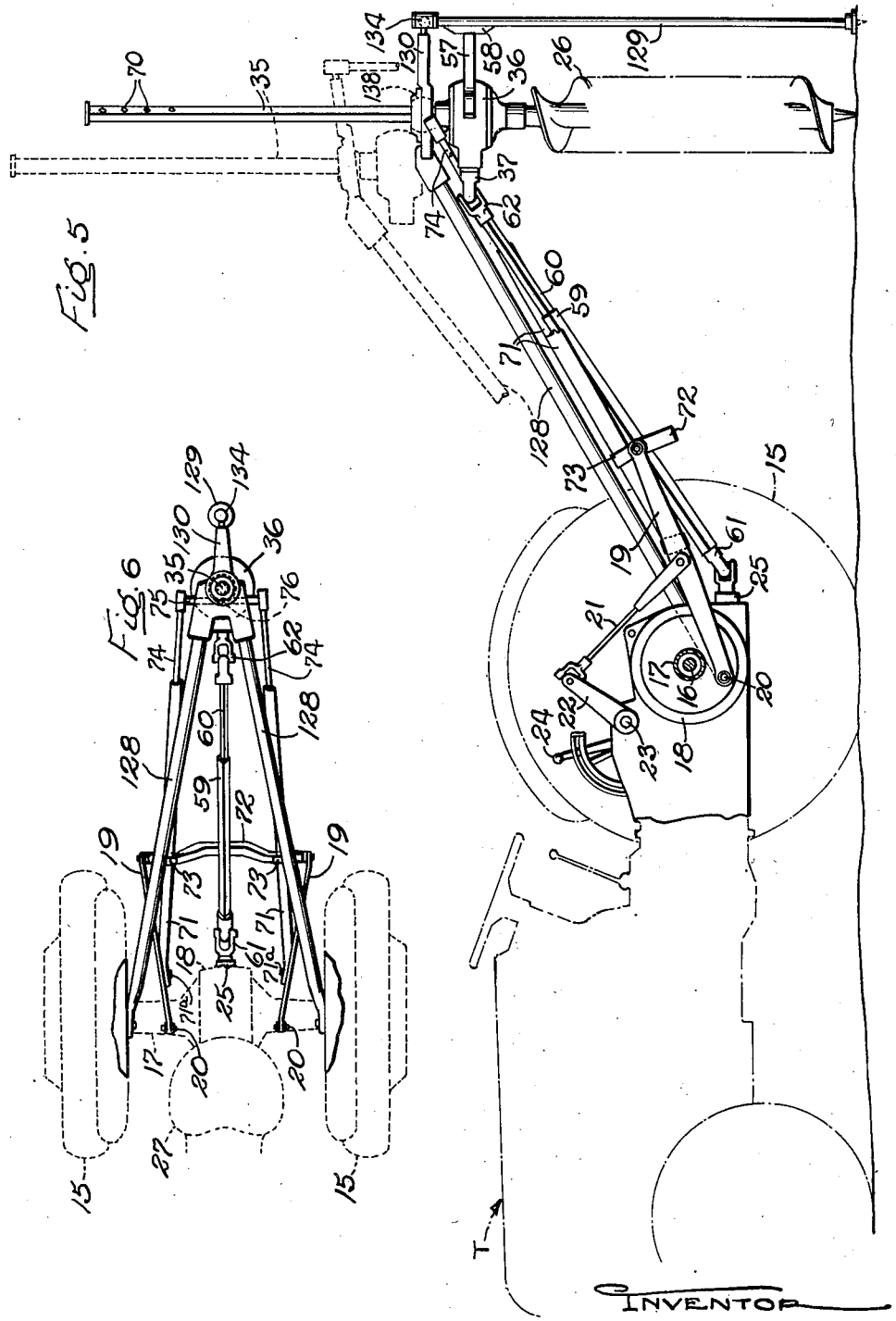

Patented Sept. 12, 1950

2,521,895

UNITED STATES PATENT OFFICE 2,521,895

EARTH BORING ATTACHMENT FOR TRACTORS

Ernest V. Bunting, Dearborn, Mich., assignor to Harry Ferguson, Inc., Detroit, Mich., a corporation of Delaware Application August 23, 1945, Serial No. 612,203

14 Claims. (Cl. 255—19)

The present invention pertains to earth boring, or so-called posthole digging, attachments for tractors.

The general aim of the present invention is to provide a novel earth boring attachment for tractors which is entirely power-operated and may be efficiently controlled by the tractor driver from his seat.

More particularly, it is an object of the invention to provide such an earth boring attachment which automatically adjusts itself for boring of a true vertical hole irrespective of irregularities of ground contour.

Another object is to provide an earth boring attachment for tractors adapted to utilize a power-operated vertically swingable draft link on the tractor for moving the boring tool vertically, but in which provision is made for insuring true vertical alignment of the hole despite the fact that the swinging draft link has a generally arcuate path of vertical movement.

Still another object is to provide an attachment of the general character indicated which is extremely simple to apply to the tractor or to dismount from the same.

Further objects and advantages of the invention will become apparent as the following description proceeds, taken in connection with the accompanying drawings in which:

Figure 1 is a side elevation of an earth auger embodying the present invention, the same being shown as mounted on the rear end portion of a tractor which is only fragmentarily illustrated, and the tractor's rear wheel nearest the observer being removed to prevent any obstruction to the view of the implement.

Fig. 2 is a plan view, on somewhat reduced scale, of the implement shown in Fig. 1 and of the rear end portion of the tractor.

Fig. 3 is a rear end elevation of a tractor with the implement of Fig. 1 mounted on it, the tractor however being shown as canted over in the position which it would occupy on a hillside, and the auger being indicated as fully entered into the ground.

Fig. 4 is an enlarged detail sectional view taken substantially along the line 4—4 in Fig. 1.

Figs. 5 and 6 are views, respectively similar to Figs. 1 and 2, but showing a modified form of implement also embodying the present invention.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, one preferred embodiment of the invention is illustrated in Figs. 1 to 4. As there indicated a posthole digging or earth boring mechanism has been provided and which is suitable for use as an attachment for a small agricultural tractor. In the present instance a tractor T has been shown which will be readily identified by those skilled in the art as the well-known Ford tractor equipped with the draft linkage and hydraulic power unit commonly employed in the Ferguson System.

By way of preliminary, those portions of the tractor which coact directly with the implement may be briefly identified, it being understood that this particular tractor is merely an example of a variety of forms which tractors may take that are adapted to receive implements embodying my present invention. At the rear end of the tractor T is a pair of pneumatic-tired tractive wheels 15 carried by a rear axle 16 in a rear axle housing 17 with a central differential housing 18. A pair of draft links 19 are universally pivoted at 20 on the rear end portion of the tractor in trailing relation to the latter, the pivot points 20 being located below and slightly forward of the axle 16. Such draft links 19 are connected by drop links 21 with crank arms 22 rigid with a rock shaft 23 arranged to be actuated by a hydraulic ram (not shown). The hydraulic power unit employed in the tractor for rocking the shaft 23 and thereby raising the draft links 19 is well-known in the art and is detailed in Henry George Ferguson Patent No. 2,118,180, issued May 24, 1938, wherefore repetition of detail here is unnecessary. For the present suffice it to say that when the operator pulls the quadrant type control lever 24 up to the position shown in Fig. 1, pressure fluid is admitted to the hydraulic ram to thereby raise the crank arms 22 and lift the draft links 19 to the position shown in full lines. Shifting the control lever 24 forward, on the other hand, exhausts fluid from the hydraulic ram so that the links 19 are permitted to lower by gravity to the lowered position indicated in broken lines.

The tractor T is also equipped with a power take-off which is utilized in the present instance for rotating the auger bit of the implement.

Such power take-off includes a power take-off shaft 25 projecting rearwardly from the lower portion of the differential housing 18 and driven from the tractor transmission by suitable connections of well-known form (not shown).

Turning now to the implement or posthole digging attachment itself, it will be perceived that it includes an earth boring tool, here shown as a spiral auger bit 26. In general the arrangement is such that the auxiliary power unit on the tractor serves to lift and lower the auger between transport and working positions and to withdraw the auger from a completed hole, the auger bit being revolved by a drive from the power take-off shaft 25. It will thus be seen that no manual labor is entailed in operating the implement and all controls are readily actuated by the tractor driver without necessity of leaving his seat, which is indicated at 27 in Fig. 2.

Particularly critical is the problem of affording generally automatic assurance of a straight hole on a true vertical line despite irregularities in ground contour and also despite the fact that the rear ends of the power-operated links 19 necessarily traverse an arcuate path in the course of raising and lowering. As to ground contour, it will be noted that the ground may slope toward or away from the tractor from the point at which the hole is to be bored (see Fig. 1) and, moreover, the ground may be sloped so as to give the tractor itself a peculiar stance as, for example, that indicated in Fig. 3. The present implement is such that no matter what the irregularities of the ground or peculiarities of tractor stance, a true vertical hole can be bored without requiring the operator to make any special leveling adjustments or the like. All he has to do is drive the tractor up so that the auger bit is located above the selected point for a hole and start boring, the axial alignment of the hole being taken care of automatically.

To afford the automatic control of hole alignment noted above, the present implement has been constructed to embody a tripod arranged to be lifted and lowered by the auxiliary power unit of the tractor and so arranged as to afford a solid footing on the ground when lowered, whatever the stance of the tractor may be. Moreover, the auger bit 26 itself is freely suspended or in the manner of a plum bob from the head of such tripod so that it will automatically seek a true vertical position. Thus the term "plumb bobbed" as here used shall be taken to mean "suspended in the manner of a plumb bod." And during the boring operation the auger bit 26 is accurately guided to move axially in the true vertical position which it has assumed.

Of the tripod, it will be observed that it includes a pair of forwardly projecting legs 28 and a third leg or pedestal 29, all connected to a head frame 30. The forward or lower ends of the divergent legs 28 are pivoted to the rear end portion of the tractor T to swing vertically about a transverse horizontal axis substantially coincident with the pivotal axis of the draft links 19. Thus the lower ends of such legs 28 are pivoted on pins 31 (Figs. 2 and 3) on stabilizer brackets 32 secured to the rear axle housing 17, being held against inadvertent removal by suitable linchpins. The tripod legs 28 for structural convenience each comprise a tubular upper portion 28a to which is fixed a smaller lower rod portion 28b. The smaller lower portion gives increased clearance with respect to the tractor axle, as may be seen in Fig. 1.

The upper ends of the forward pair of tripod legs 28 are rigidly fixed to the tripod head frame 30. The latter frame (see Fig. 4) comprises a generally U-shaped bar 30a to which is rigidly fixed a pair of spaced transverse bars 30b. The third or rear leg 29 of the tripod is arranged to dangle freely from the head frame 30 so that it, like the auger bit 26, may plumb bob into a substantially true vertical position. For that purpose the leg 29 has an eye 33 (Fig. 3) at its upper end engaged with an eye on a bolt 34 on the head frame, the latter bolt having a shank portion extending through and fixed to the adjacent one of the transverse frame bars 30b (see Fig. 4).

The auger bit 26 forms a part of an auger subassembly which is supported and guided by the tripod described above. Such subassembly includes, in addition to the auger bit itself, a guide rod 35 and a drive housing 36. Projecting forwardly from the housing 36 is a drive shaft 37 which is connected by suitable gearing (not shown) within the housing 36 to the auger bit 26, for revolving the latter, the upper end of the auger bit shaft being journaled in the housing. Guide means is provided on the tripod head frame 30 for slidably guiding the auger subassembly in its vertical movement. Such guide means is here shown (Fig. 4) as a gimbal including a square guide member 38 slidably embracing the guide rod 35 which is also of square cross-section. The angular sliding interfit of the rod 35 and member 38 provides a torque resisting connection. Such guide 38 is pivoted at 39 to rock about a transverse axis on a rectangular subframe 40. The latter subframe is located between the bars 30b, being pivoted on the inner end of the shank of the bolt 34 and on a bolt 41 to rock about a longitudinal axis normal to the axis of the pivots 39.

To utilize the power-operated draft links 19 for raising and lowering the tripod, as well as for elevating the auger bit assembly, an A-frame designated generally as 42 is employed. Such A-frame 42 includes converging upwardly extending tubular side bars 43 having their lower ends pivoted at 44 on the tubular portions 28a of the tripod arms 28 so that the A-frame may rock fore and aft. Struts 45 brace the A-frame side bars 43 and are rigidly joined to the offset central portions of the latter by members 46. Between these members 46 is journaled a transverse shaft 47 to which are rigidly fixed downwardly extending legs 48 braced by a reenforcing strap 49. On the lower ends of the legs 48 are brackets 50 of inverted L-shape carrying pivot pins 51 through which the legs are adapted to be removably connected with the universally swiveled apertured balls 52 conventionally mounted on the trailing ends of the draft links 19 in a Ferguson linkage. The usual linchpins secure the connections. It will thus be seen that as the draft links 19 are raised and lowered, the A-frame 42 is rocked fore and aft between the full and broken line positions indicated in Fig. 1.

To connect the A-frame 42 with the auger bit subassembly for raising and lowering the latter as the A-frame swings fore and aft, a cable 53 is utilized. Such cable is trained over a sheave 54 pivotally supported on the upper end of the A-frame, as well as over a pair of guide sheaves 55 journaled on a transverse shaft 56 (Fig. 4) carried by the gimbal subframe 40, the ends of the cable being anchored to the drive housing 36. Since the cable runs over the guide sheaves 55 on the tripod head, the auger subassembly is, in effect, suspended from the tripod for vertical movement with reference to it.

As the A-frame 42 is rocked forward toward the full line position shown in Fig. 1, the cable 53 is pulled forward, thus raising the auger bit subassembly until the top of the housing 36 strikes the underside of the tripod head frame 30. Thereafter continued forward swing of the A-frame lifts the tripod as well as the auger subassembly until they finally reach the transport position shown in full lines in Fig. 1. Similarly, upon rocking of the A-frame 42 rearwardly in a lowering direction, the tripod and auger subassembly descend until the rear tripod leg 29 strikes the ground, and thereafter the auger subassembly continues its descent, further lowering of the tripod being prevented.

To prevent the rear tripod leg 29 from inadvertently swinging over into contact with the auger bit 26, a bracket 57 is fixed on the rear side of the drive housing 36 in position to coact with an enlargement or cam means 58 on the tripod leg 29. In the structure shown contact of the cam 58 with the bracket 57 limits forward swing of the leg 29 beyond a true vertical position as the tripod is being lowered. As the descent of the auger continues, subsequent to grounding of the tripod, the bracket 57 rides off the cam 58, however, so that there is no frictional impediment to auger movement after the leg 29 has once been firmly located. The sloping ends of the cam 58 permit it to ride freely into engagement with the bracket 57 in either a raising or lowering direction. Obviously the bracket and cam may be so shaped and related as to prevent or limit any undesired movement of the leg 29 while permitting descent or rise of the auger subassembly or during transportation of the implement.

The drive connection from the power take-off shaft 25 to the auger drive shaft 37 is accomplished through an extensible propeller shaft including a tubular member 59 slidably keyed or splined to an inner member 60. The shaft members 59 and 60 are connected by respective universal joints 61, 62 with the power take-off shaft 25 and drive shaft 37.

If desired a torque arm may be used with the guide rod 35 and coacting gimbal to prevent rotation of the drive housing 36 as the auger bit 26 revolves or a torque arm may be used alone, in which case the angular relation of the guide rod and gimbal may be omitted. Such torque arm may, for example, include a tubular member 63 slidably telescoped over a rod 64, the tubular member having a transverse tubular end portion 65 journaled on a pin 66 extending between lugs 67 on the drive housing 36. At the opposite end of the torque arm the member 63 has a clevis 68 received in an eye 69 on the transverse shaft 47.

In operating the implement described, the tractor T is driven to a selected location with the implement positioned for transport as shown in full lines in Fig. 1. The tractor is maneuvered until the auger bit 26 is located substantially above the point at which the hole is to be bored. When so located the auger subassembly is freely suspended, complete freedom of lateral swing being afforded by the gimbal on the tripod head frame, so that the auger bit 26 assumes a true vertical position, irrespective of ground contour. The rear tripod leg, which is dangling freely from the tripod head frame at such time, also assumes a true vertical position.

Having maneuvered the tractor T into position, the power take-off shaft 25 is set in operation by suitable controls (not shown) and as a matter of fact it may be left continuously in operation if desired. Then the tractor driver pushes the hydraulic control lever 24 forward, thereby permitting the draft links 19 to lower. As such links swing downward, the A-frame 42 is rocked to the rear, slacking-off the cable 53 so that the tripod and auger subassembly are lowered. Such lowering of the tripod continues until the rear leg 26 is grounded, whereupon the tripod comes to rest in fixed position which it maintains throughout the subsequent boring operation.

Continued slacking off of the cable 53 after the tripod is grounded permits the revolving auger bit to descend. As it bites into the ground the spiral of the auger bit itself feeds it downward. Such downward motion is guided by the rod 35 passing through the gimbal on the tripod head frame. As the boring continues, the operator may manipulate the control lever 24 to lift the auger bit partially from the hole from time to time and free the bit of any excess load of dirt as may be required by the character of the soil being bored. If desired, a transverse pin (not shown) may be inserted in one of a series of holes 70 (Fig. 1) in the upper portion of the guide rod 35 to limit the downward movement of the auger bit and thus predetermine the depth of hole to be bored.

At the completion of the boring operation the operator has only to swing the hydraulic control lever 24 upward, whereupon the draft links 19 rise, rocking the A-frame 42 forward and withdrawing the auger bit from the completed hole. As the rise of the auger bit continues, the drive housing 36 abuts the tripod head frame 30 so that the tripod and auger are finally lifted again to transport position. The tractor can then be quickly driven to the next point of use and the operation repeated for boring another hole.

Attachment and detachment of the implement is a very simple matter indeed. For detachment the drive to the power take-off shaft 25 is stopped and the implement lowered. With the rear tripod leg resting on the ground, the operator disconnects the universal joint 61 from the power take-off shaft, disconnects the arms 48 from the draft links 19, and pulls the forward tripod legs 28 from the pins 31 on the stabilizer brackets 32. The forward tripod legs 28 are dropped to the ground and the implement is thus freed from the tractor. To use it again the sequence of steps noted is simply reversed.

A modified form of posthole digging or earth auger attachment for a tractor, also embodying the present invention, has been shown in Figs. 5 and 6. The implement has been illustrated there as applied to a tractor T identical with the tractor heretofore described, and accordingly the same reference numerals have been used for corresponding parts, and no further description is required. An earth auger subassembly is included in the implement of Figs. 5 and 6 which may be substantially identical with the corresponding subassembly in the implement of Figs. 1 to 4 so that no further detailing is required, the same being shown as including a bit 26, drive housing 36, and guide rod 35. As before, an extensible drive shaft 59, 60 connects the power take-off shaft 25 with the drive shaft 37.

A tripod form of supporting structure, pivoted on the tractor for bodily lifting and lowering movement is, again, employed for guidingly sustaining the auger subassembly. In this instance the tripod includes a forwardly projecting pair of legs 128, corresponding to the legs 28 of the implement of Figs. 1 to 4, and which may be pivoted on the stabilizer brackets just as in the case of such legs 28. Moreover, the tripod also includes a third leg 129 corresponding to the leg 29 heretofore described, and which is freely swingable on a ball joint 134. The tripod has a head frame or member 130 carrying a generally centrally located gimbal 138, fashioned in this instance in the form of a portion of a sphere centrally apertured to slidingly receive the guide rod 70. The sphere is keyed so as to hold the rod against rotation but otherwise is adapted for universal movement.

As so far described, the implement of Figs. 5 and 6 is substantially like that of Figs. 1 to 4, both including a vertically movable auger subassembly slidably guided by a vertically movable tripod or supporting structure. The two differ primarily in reference to the arrangement provided for connecting the implement for actuation by the power lift device on the tractor. Instead of employing the rocking A-frame and cable arrangement of Figs. 1 to 4, the implement of Figs. 5 and 6 utilizes a simpler and somewhat more direct connection from the draft links 19 to the auger subassembly, although this simplification is achieved at the sacrifice, at least to some degree, of the fidelity of operation afforded by the previously described implement.

The connection employed in the implement of Figs. 5 and 6 from the draft links 19 to the auger subassembly comprises a pair of tubular members 71 bolted, as at 71a, to respective ones of the draft links 19 and resting on a transverse member 72 detachably secured to the trailing ends of the links. C-shaped hooks 73 hold the tubular arms 71 to the transverse member 72. The central portion of such transverse member is offset downwardly to clear the propeller shafting 59, 60.

It will thus be seen that the tubular members 71 constitute, in effect, rigid rearwardly converging extensions of the draft links 19. Slidably received in each of the tubular members 71 are rods 74 which complete the lifter arms, thus making the lifter arms 71, 74 axially extensible. The outer ends of the rods 74 are pivoted to the respective ends of a transverse leveler bar 75 which is centrally pivoted at 76 on the upper portion of the drive housing 36 for lateral rocking movement with respect to the latter.

As the hydraulically actuated draft links 19 rise and fall, the lifter arms 71, 74 correspondingly raise and lower the auger subassembly. In the course of the rising movement of the auger subassembly the top of the drive housing 36 abuts against the lower side of the gimbal 138, whereupon in the continued elevation of the auger subassembly the tripod is also lifted bodily, the forward pair of legs 128 pivoting about their lower ends and the third leg 129 being elevated free of the ground. The implement is thus raised to the transport position indicated by broken lines in Fig. 5. Upon lowering the implement the opposite sequence of movements takes place, the tripod and auger subassemblies moving down in unison until the tripod leg 129 is grounded, whereupon the downward movement of the auger subassembly is continued while the tripod remains stationary. As before, a bracket 57 on the housing 36 and coacting cam 58 on the tripod rear leg 129 are provided for preventing inadvertent interference of such leg with the auger.

From an examination of Fig. 5, it will be perceived that both the auger subassembly and rear leg 129 of the tripod are arranged to plumb bob into substantially true vertical positions therefor no matter what the stance of the tractor or contour of the ground may be, just as in the case of the implement of Figs. 1 to 4. Moreover, the extensible character of the lifter arms 71, 74 permits them to diminish gradually in length as the auger bit 26 moves into the ground, so that they do not impart a substantial thrust tending to rock the bit rearwardly. The extensible character of the propeller shafting 59, 60 similarly prevents any substantial lateral thrust from it.

If desired the torque resistance offered by the guide rod and its associated parts may be supplemented or replaced by a torque arm such, for example, as the torque arm arrangement described and illustrated for the implement of Figs. 1 to 4.

I claim as my invention:

1. In an earth boring attachment for a tractor having both a power lift device and a power take-off on its rear end portion adjacent a transverse rear axle housing, the combination of a tripod having a pair of forwardly projecting legs with means for pivoting their lower ends to the tractor axle housing for vertical swing of such pair of legs with reference to the tractor and having a ground-engaging supporting leg, a boring tool subassembly including a boring tool and an upright guide rod, means on said tripod guidingly receiving said rod for endwise movement of the latter, said tripod and subassembly presenting opposed portions abutted together in the course of upward movement of said subassembly, means for connecting said subassembly to the tractor-borne power lift device for elevation by the latter of such subassembly, the abutment of said opposed portions in the course of such elevation causing said tripod to be swung bodily upward by the lift device and with said pair of legs pivoting about the rear axle housing, and means for drivingly connecting the power take-off to said boring tool.

2. In an earth boring attachment for a tractor having both a power lift device and a power take-off on its rear end portion adjacent a transverse rear axle housing, the combination of a tripod having a pair of forwardly projecting legs with means for pivoting their lower ends to the tractor axle housing for vertical swing of such pair of legs with reference to the tractor, said tripod also having a third leg arranged to dangle freely in true vetrical position upon bodily lowering of said tripod toward the ground, a boring tool subassembly including a boring tool and an upright guide rod, means on said tripod guidingly receiving said rod for endwise movement of the latter, said tripod and subassembly presenting opposed portions abutted together in the course of upward movement of said subassembly, means for connecting said subassembly to the tractor-borne power lift device for elevation by the latter of such subassembly, the abutment of said opposed portions in the course of such elevation causing said tripod to be swung bodily upward by the lift device and with said pair of legs pivoting about the rear axle housing, the grounding of said freely swingable third leg of said tripod upon lowering movement of the power lift device serving to arrest further lowering of said tripod, and means for drivingly connecting the power take-off to said boring tool.

3. In an earth boring attachment for a tractor having both a power lift device and a power take-off thereon, the combination of a supporting frame having means for pivoting the same to the rear end of the tractor to swing between an elevated transport position and a lowered working position and having a member which is arranged to supportingly contact the ground in the latter position, a boring tool subassembly disposed below the frame and including a boring tool, means for drivingly connecting the power take-off to said boring tool, a gimbal on said supporting frame guiding said subassembly for vertical movement with reference thereto while leaving said subassembly free to pendulously assume a true vertical position, said supporting frame and subassembly each having elements presenting oppositely disposed surfaces which are out of engagement when the tool is lowered but which are abutted together in the course of upward movement of said subassembly, and means including a linkage connected at one end to said subassembly and connectible at the other end thereof to the tractor-borne power lift device for elevation by the latter of said subassembly, the abutment of said oppositely disposed surfaces of the subassembly and the frame in the course of elevation of said subassembly causing said frame to be swung bodily upward by the lift device raising said supporting member clear of the ground.

4. In an earth boring attachment for a tractor having both a power lift device and a power take-off on its rear end portion adjacent a transverse rear axle housing, the combination of a tripod having a pair of forwardly projecting legs with means for pivoting their lower ends to the tractor axle housing for vertical swing of such pair of legs with reference to the tractor, said tripod also having a third leg arranged to dangle freely in true vertical position when the tripod is lifted above the ground, a boring tool subassembly including a boring tool and an upright guide rod, a gimbal on said tripod guidingly receiving said rod for endwise movement of the latter while leaving said subassembly free to assume a true vertical position, said tripod and subassembly presenting opposed portions abutted together in the course of upward movement of said subassembly, means for connecting said subassembly to the tractor-borne power lift device for elevation by the latter of such subassembly, the abutment of said opposed portions in the course of such elevation causing said tripod to be swung bodily upward by the lift device and with said pair of legs pivoting about the rear axle housing, and means for drivingly connecting the power take-off to said boring tool.

5. In an earth boring attachment for a tractor having both a power lift device and a power take-off on its rear end portion adjacent a transverse rear axle housing, the combination of a tripod having a pair of forwardly projecting legs with means for pivoting their lower ends to the tractor axle housing for vertical swing of such pair of legs with reference to the tractor, said tripod also having a third leg arranged to dangle freely in true vertical position when the tripod is lifted above the ground, a boring tool subassembly including a spiral earth auger journaled in a drive housing at its upper end and an upright guide rod rigid with said housing, means on said tripod guidingly receiving said rod for endwise movement of the latter while leaving said subassembly free to assume a true vertical position, said tripod and subassembly presenting opposed portions abutted together in the course of upward movement of said subassembly, means for connecting said subassembly to the tractor-borne power lift device for elevation by the latter of such subassembly, the abutment of said opposed portions in the course of such elevation causing said tripod to be swung bodily upward by the lift device and with said pair of legs pivoting about the rear axle housing, and means for drivingly connecting the power take-off to said boring tool.

6. In an earth boring attachment for a tractor having both a power lift device and a power take-off, the combination of a tripod, means for pivoting the lower ends of two legs of said tripod at respective laterally spaced points on the rear end of said tractor for vertical swinging movement of said legs with the same projecting upwardly and rearwardly of the tractor side by side with each other, an articulated connection for supporting the third leg of said tripod to dangle freely for contact with the ground in substantially true upright position upon lowering of said tripod by downward swing of the first-mentioned pair of legs, an earth auger, linkage for suspendingly supporting the same from said tripod for free swinging movement with respect thereto, said linkage being connectible at one end to the power lift device for moving the auger with reference to said frame, and means including a drive shaft coupled to said auger and connectible with the power take-off on said tractor for rotating the auger.

7. In an earth boring attachment for a tractor having both a pair of power elevated draft links and a power take-off thereon, the combination of a supporting structure including a frame and a leg rigid with the frame and connectible to the rear end of the tractor to swing between an elevated transport position and a grounded working position, a boring tool subassembly including a boring tool, means including a supporting member connected to the frame and a guide member connected to said subassembly, said members being interconnected for universal movement and the latter guiding said subassembly for vertical movement with reference thereto, said supporting frame and subassembly each having elements presenting separable opposed surfaces abutted together in the course of upward movement of said subassembly, a force transmitting lever mounted on said frame to rock fore and aft thereof, means including a member pivotally joined to said lever and connectible to the tractor-borne draft links for forward and rearward rocking movement of the lever by the draft links, a flexible line connecting said lever and tool for raising and lowering of the latter by rocking of said lever, the abutment of said opposed surfaces in the course of elevation of said tool causing said frame to be swung bodily upward by the draft links, and means including a shaft for drivingly connecting the power take-off to said boring tool.

8. In an earth boring attachment for a tractor having both a power lift device and a power take-off on its rear end portion adjacent a transverse rear axle housing, such power lift device including a pair of vertically swingable laterally spaced draft links, the combination of a tripod including a head from which a pair of legs project forwardly in side-by-side relation, means for pivotally connecting the lower ends of said legs to the tractor for swinging of said legs vertically about an axis substantially coincident with the pivotal axis of the draft links, said tripod also including a third leg arranged to dangle freely from said head when the latter is elevated, a rigid A-frame pivoted on said pair of tripod legs in generally upright position to rock fore and aft thereon, means for connecting said frame to the tractor-borne draft links for rocking said frame in response to raising and lowering of the links, an auger subassembly including an earth auger rotatably journaled in a drive housing at its upper end and also including a guide rod rigid with said housing and rising therefrom, guide means universally mounted on said tripod head slidably engaging said rod for axial movement of the latter while restraining the same against rotation and permitting free pendulous swing of said subassembly, and a flexible line connected to said A-frame and to said subassembly for sliding the latter vertically with reference to said tripod in response to rocking of said A-frame by the draft links, said subassembly having means thereon engageable with said tripod at the completion of a predetermined upward movement of said subassembly to effect raising of said tripod as the tensioning of said line by swinging of said frame continues.

9. In an earth boring attachment for a tractor having both a power lift device and a power take-off on its rear end portion adjacent a transverse rear axle housing, such power lift device including a vertically swingable draft link, the combination of a tripod including a head from which a pair of legs project forwardly in side-by-side relation, means for pivotally connecting the lower ends of said legs to the tractor for swinging of said legs vertically about an axis substantially coincident with the pivotal axis of the draft link, a rigid member pivoted on at least one of said pair of tripod legs in generally upright position to rock fore and aft thereon, means for connecting said member to the tractor-borne draft link for rocking said frame in response to raising and lowering of the link, an auger subassembly including an earth boring tool and an upright guide rod, guide means universally mounted on said tripod head slidably engaging said rod for axial movement of the latter while restraining the same against rotation and permitting free pendulous swinging of said subassembly, and a flexible line connected to said member and to said subassembly for sliding the latter vertically with reference to said tripod in response to rocking of said member by the draft link, said subassembly having means thereon engageable with said tripod at the completion of a predetermined upward movement of said subassembly to effect raising of said tripod as the tensioning of said line by swinging of said member continues.

10. In an earth boring attachment for a tractor having a pair of laterally spaced draft links trailingly pivoted to swing vertically on its rear end portion and a power lift device for raising the same, the combination of a supporting tripod having means on two legs thereof for pivoting the same to the rear end of the tractor for bodily vertical swing of said tripod between elevated transport position and lowered working position in which the third leg of the tripod rests on the ground, an auger subassembly including an auger bit depending from a drive housing and a guide rode projecting rigidly upward from such housing, a gimbal on said tripod slidably engaging said guide rod to guide the latter's endwise movement while leaving said subassembly free to pendulously assume a true vertical position, a pair of slidably extensible lifter arms adapted to be secured to respective ones of the draft links to project rearwardly therefrom side by side, a leveler bar pivoted intermediate its ends to said housing and at its ends to the rear ends of respective ones of said arms, and said tripod and housing presenting opposed portions for abutment together upon raising of said subassembly by said arms to effect lifting of said tripod and subassembly in unison by said arms following such abutment.

11. In an earth boring attachment for a tractor having both a draft link trailingly pivoted to swing vertically on its rear end portion and a power lift device for raising the same, the combination of a supporting framework pivotally connectible to the tractor to swing vertically between an elevated transport position and a grounded working position, a boring tool subassembly, means including supporting and guide members respectively connected with said framework and said subassembly, said members being swivelly interconnected so as to slidably guide said subassembly in said framework for vertical movement with reference thereto while permitting free pendulous swing thereof in any direction, a lifter arm pivotally connectible at its inner end with said tractor for fore and aft bodily swing by said draft link and having its outer end in supporting engagement with said subassembly, said lifter arm having two axially extensible portions maintained in free sliding engagement so that said subassembly is enabled constantly to maintain a true vertical position regardless of the orientation or elevation of said subassembly relative to the ground surface.

12. In an earth boring attachment for a tractor having both a power elevated draft link trailingly pivoted to swing vertically on its rear end portion and a power take-off, the combination of a supporting framework connectible at its forward end to the rear end of the tractor to swing vertically between an elevated transport position and a grounded working position, a support connected to the outer end of said frame for limiting downward movement thereof to define the working position, a boring tool subassembly including a depending auger, a torque-transmitting connection for drivingly connecting said auger with said power take-off on the tractor, said subassembly having a first guide member extending upwardly therefrom, a second guide member on said frame engaging said first guide member, said second guide member having a universal connection with said frame, a lifter arm connected at one end to the power elevated draft link and coupled at the other end to said boring tool subassembly for bodily raising the same with respect to said second guide member, said lifter arm including two portions relatively slidable with respect to one another to permit said auger to assume a true vertical position regardless of the orientation of the tractor and the position relative to the tractor of the lifter arm.

13. In an earth boring attachment for a tractor having both a power elevated draft link trailingly pivoted to swing vertically on its rear end portion and a power take-off, the combination of a supporting framework connectible at its forward end to the rear end of the tractor to swing vertically between an elevated transport position and a lowered working position, a support connected to the outer end of said frame for limiting the downward movement thereof and thereby defining said working position, a boring tool subassembly having an auger extending downwardly and a guide rod extending upwardly therefrom, a hollow guide member on said frame for receiving said guide rod, said guide member having a gimbal connection with said frame, a lifter member connected at one end to the power elevated draft link and connected at the other end to said boring tool subassembly for bodily raising the same with respect to said hollow guide member, and a torque-transmitting connection for drivingly connecting said auger with said power take-off on the tractor.

14. In an earth boring attachment for a tractor having both a power take-off and a power lift device thereon, the combination of a supporting framework connectible at its forward end to the rear end of the tractor and extending upwardly and rearwardly therefrom, a boring tool subassembly having an auger extending downwardly therefrom toward the ground, a guide on said frame at the outer end thereof, a vertical member connected to said boring tool subassembly and extending upwardly therefrom into engagement with said guide to enable the auger to be positioned over a desired spot on the ground, a lifter member connected to said power lift device at one end and coupled to the subassembly at the other for raising and lowering said subassembly relative to said frame, a pedestal connected to the outer end of said frame and arranged to support said frame in its lowered working position, said pedestal having a freely pivoted connection with said frame so that it assumes a true vertical position prior to locating the pedestal in supporting engagement with the ground, and a torque-transmitting member for interconnecting the power take-off with the auger for rotating the same, said frame and subassembly having opposed surfaces respectively positioned to engage one another when the subassembly is drawn upwardly and said framework having a pivot connection with said tractor about a transverse axis thereon so that upon continuous upward movement of said subassembly engagement of said opposed surfaces causes said framework to be swung upwardly clear of the ground.

ERNEST V. BUNTING.

REFERENCES CITED

The following references are of record in the file of this patent:

UNITED STATES PATENTS

| Number | Name | Date |
|---|---|---|
| 515,731 | Daugherty et al. | Feb. 27, 1894 |
| 1,220,949 | Camp | Mar. 27, 1917 |
| 1,641,926 | Genung | Sept. 6, 1927 |
| 1,674,189 | Brown | June 19, 1928 |
| 1,921,812 | Erdahl | Aug. 8, 1933 |
| 2,320,775 | Garner | June 1, 1943 |
| 2,321,680 | Houston | June 15, 1943 |